(12) United States Patent
Menon et al.

(10) Patent No.: US 9,164,369 B2
(45) Date of Patent: Oct. 20, 2015

(54) PATTERNING VIA OPTICAL-SATURABLE TRANSITIONS

(75) Inventors: Rajesh Menon, Salt Lake City, UT (US); Trisha L. Andrew, Cambridge, MA (US); Francesco Stellacci, Somerville, MA (US)

(73) Assignee: Massachusettes Institute of Technology, Cambridge, MA (US)

( * ) Notice: Subject to any disclaimer, the term of this patent is extended or adjusted under 35 U.S.C. 154(b) by 797 days.

(21) Appl. No.: 12/749,960

(22) Filed: Mar. 30, 2010

(65) Prior Publication Data
US 2010/0248159 A1 Sep. 30, 2010

Related U.S. Application Data

(60) Provisional application No. 61/164,602, filed on Mar. 30, 2009.

(51) Int. Cl.
*G03F 7/20* (2006.01)
*G03B 27/00* (2006.01)

(52) U.S. Cl.
CPC ...................... *G03B 27/00* (2013.01)

(58) Field of Classification Search
USPC .............................. 369/275.1, 100
See application file for complete search history.

(56) References Cited

U.S. PATENT DOCUMENTS 7,060,510 B2  6/2006 Bonnel et al.
2002/0186450 A1 * 12/2002 Foucher et al. ............... 359/296
2003/0064532 A1  4/2003 Chen
2007/0000866 A1  1/2007 Ryan et al.
2009/0263612 A1 * 10/2009 Gascoyne et al. ........... 428/64.4

OTHER PUBLICATIONS

Kawai et al., A Dual-Mode Molecular Switching Device, Chem. Eur J 1995, 1, No. 5. Weinheim pp. 285-293.
Galindo et al., Write-Read-Erase Molecular-Switching System Trapped in a Polymer Hydrogel Matrix, Adv. Funct. Mater. 2005, 15, No. 4, April. Weinheim pp. 541-545.
Hell et al., Diffraction-unlimited three-dimensional optical nanoscopy with opposing lenses, Nature Photonics, vol. 3, Jul. 1999. Macmillan Publishers Ltd. USA pp. 381-387.
Gorodetsky et al., Bidirectional Ring-Opening and Ring-Closing of Cationic 1,2-Dithienylcyclopentene Molecular Switches Triggered with Light or Electricty, Adv. Funct. Mater 2007, 17, Weinheim. pp. 786-796.
Pina et al., Photochromism of 4'-Methoxyflavylium Perchlorate, J American Chemical Society 1997, 119. USA pp. 5556-5561.
International Search Report and the Written Opinion issued on Oct. 27, 2010 in connection with corresponding PCT Application No. PCT/US2010/029188.

* cited by examiner

*Primary Examiner* — Daborah Chacko Davis
(74) *Attorney, Agent, or Firm* — Gesmer Updegrove LLP (57) ABSTRACT

An optical material system for nanopatterning is provided that includes one or more material systems having spectrally selective reversible and irreversible transitions by saturating one of the spectrally selective reversible transitions with an optical node retaining a single molecule in a configuration and exposing the single molecule to its spectrally irreversible transitions to form a pattern.

12 Claims, 12 Drawing Sheets

PATTERNING VIA OPTICAL-SATURABLE TRANSITIONS

PRIORITY INFORMATION

This application claims priority from provisional application Ser. No. 61/164,602 filed Mar. 30, 2009, which is incorporated herein by reference in its entirety.

BACKGROUND OF THE INVENTION

The invention relates to the field of nanoscale resolution, and in particular to a technique of achieving nanoscale resolution in three dimensions using light.

Patterning in three dimensions has important applications in photonic devices and micromachines. Three dimensional (3-D) micro- and nanostructures have been traditionally patterned via a layer-by-layer approach. The 3-D pattern is broken up into a series of 2-D layers, which are then overlaid on top of each other. Besides being extremely time-consuming, such approaches require very accurate overlay capabilities. Modifications to this approach via foldable and stackable membranes have also been proposed. However, the fundamental limitations still remain.

An alternative approach for 3-D nanopatterning involves 2-photon or multi-photon processes. These require extremely high light intensities. It has been difficult to achieve nanoscale resolution using multi-photon approaches because the conventional photopolymers almost always work in the UV (~350 nm), which implies that 2 photons in the near IR (~700 nm) are required to initiate the 2-photon polymerization. The achievable resolution is given by the conventional far-field diffraction limit divided by square root of the number of photons involved. So, for a two-photon process, the minimum feature size or resolution is given by:

$$W_{min} = k_1 \frac{\lambda}{NA} \times \frac{1}{\sqrt{2}} \qquad \text{Eq. 1}$$

The improvement in resolution by $\sqrt{2}$ is effectively cancelled by the 2-fold increase in wavelength. The achievable resolution in this case is limited to several hundred nanometers.

SUMMARY OF THE INVENTION

According to one aspect of the invention, there is provided an optical material system for nanopatterning. The optical material system includes one or more material systems having spectrally selective reversible and irreversible transitions by saturating one of the spectrally selective reversible transitions with an optical node retaining a single molecule in a configuration and exposing the single molecule to its spectrally irreversible transitions to form a pattern.

According to another aspect of the invention, there is provided an optical system for nanopatterning. The optical system includes means for providing spectral energy having a plurality of different wavelengths. An optical material system includes one or more material systems having spectrally selective reversible and irreversible transitions associated with the different wavelengths. The means for providing spectral energy saturates one of the spectrally selective reversible transitions with an optical node retaining a single molecule in a configuration and exposing the single molecule to its spectrally irreversible transitions to form a pattern.

According to another aspect of the invention, there is provided a method of performing nanopatterning. The method includes providing one or more material systems having spectrally selective reversible and irreversible transitions. Also, the method includes saturating one of the spectrally selective reversible transitions with an optical node retaining a single molecule in a configuration and exposing the single molecule to its spectrally irreversible transitions to form a pattern.

DETAILED DESCRIPTION OF THE INVENTION

The invention provides a technique of achieving nanoscale resolution in three dimensions using light. The basic idea is to use a material system that can undergo reversible photo-initiated transitions. The current invention does not require high intensities. Specific combinations of chemical species enable patterning, and the idea can be extended to 3-D nanopatterning. The idea makes use of spectrally selective reversible and irreversible transitions enabled by chemistry. By saturating one of the reversible transitions with an optical node, it is possible to retain a single molecule in one configuration compared to its neighbors. By using a separate irreversible transformation, one can fix this molecule. This approach is called patterning via optical-saturable transitions (POST).

Figure 1:
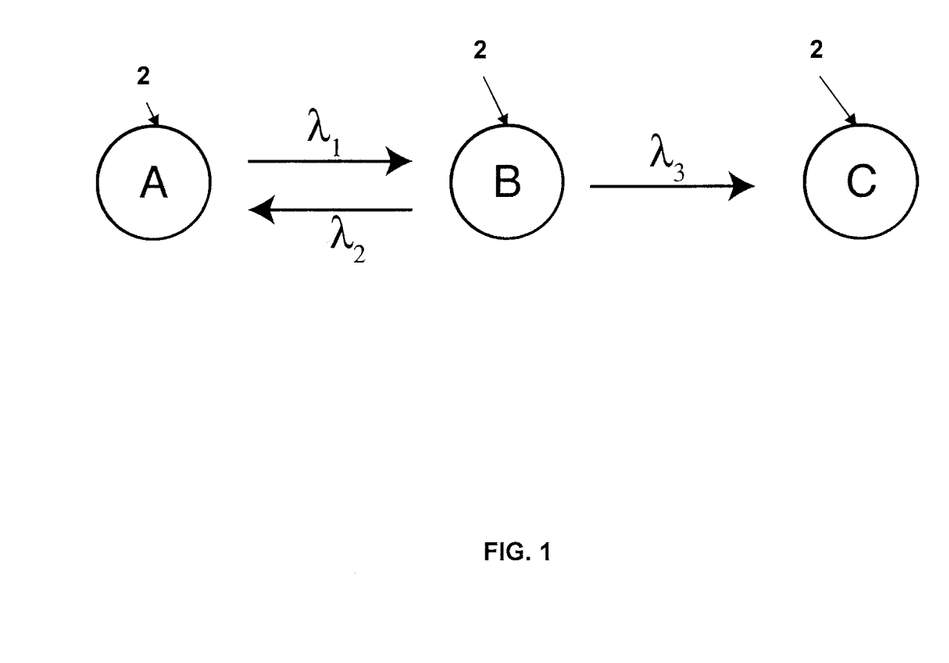
FIG. 1 is a schematic diagram illustrating a scheme for photo-initiated transitions.

A material system 2 and the desired photo-initiated transitions are illustrated in FIG. 1. In particular, FIG. 1 shows transitions between state A and state B of the material system 2 are reversible under wavelengths $\lambda_1$ and $\lambda_2$ while the transition from state B to state C is irreversible under wavelength $\lambda_3$.

Figure 2:
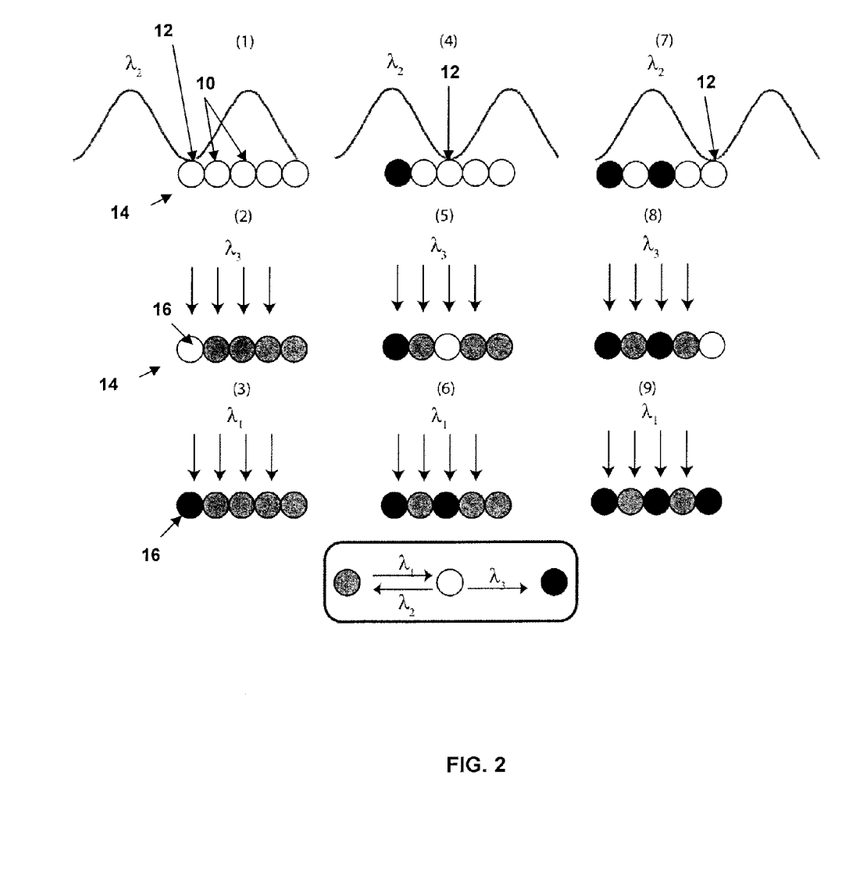
FIG. 2 is a schematic diagram illustrating two dimensional (2-D) nanopatterning.

A material system that undergoes photoinduced reversible as well as irreversible transformations can be used to achieve single-molecule resolution in 2-D patterning. This is illustrated by a sequence of steps in FIG. 2. For simplicity, one can assume that all molecules 10 begin in state B. This is easily achieved by irradiating the film at wavelength, $\lambda_1$ for a sufficiently long period. A single layer 14 of molecules is assumed for simplicity, but this is not essential. The sequence of steps 1-3 is outlined where a node 12, in 2 dimensions at wavelength $\lambda_2$, is positioned at the location of the desired exposure (x,y). Over time, all the molecules, except one at the node convert to the state A, as shown in step 1. Uniform illumination at wavelength, $\lambda_3$ converts only the molecule 14 in state, B to a third state C via a photo-induced, irreversible transformation, as shown in step 2. Uniform illumination at wavelength, $\lambda_1$ converts the molecules 10 in state A back to state B., as shown in step 3 The molecule 14 in state C is unaffected.

Figure 3:
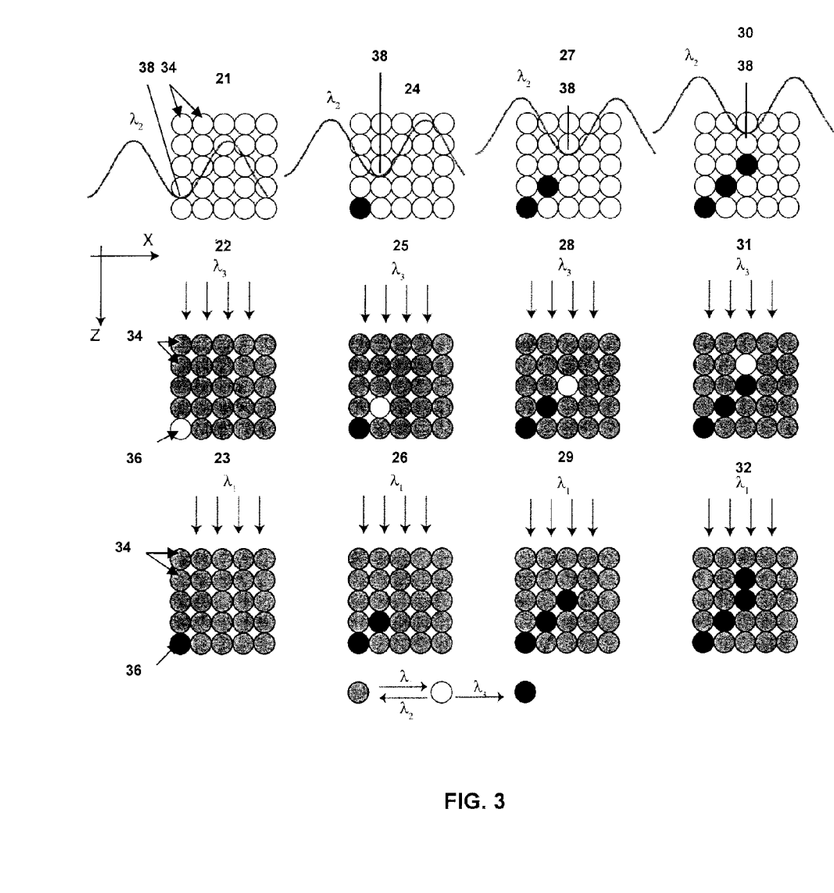
FIG. 3 is a schematic diagram illustrating three dimensional (3-D) nanopatterning.

Then, the sample is moved with respect to the 2-D node 12 at $\lambda_2$ to a different location as shown and the three steps 1-3 are repeated as shown for steps 4-6 and steps 7-9. Permanent patterns in state C are formed as shown in FIG. 3. If the state C is preferentially soluble in a solvent over states A and B, then 2-D topographical features can be realized. In the example illustrated in FIG. 2, the pattern includes a grating of period of two molecules. It is important to note that the states B and C have negligible absorption at $\lambda_1$, states A and C have negligible absorption at $\lambda_2$, and states A and B have negligible absorption at $\lambda_3$.

In order to apply this material system that undergoes reversible photo-initiated transitions to 3-D nanopatterning, the following sequence of steps is required. These steps are illustrated in FIG. 3. First, all the molecules in the region of interest is in the state B. A node 38, in 3 dimensions at wavelength $\lambda_2$, is positioned at the location of the desired exposure (x,y,z). Over time, all the molecules, except one at the node convert to the state A, shown in step 21. A uniform illumination at a wavelength $\lambda_3$ converts only the molecule 36 in state B to a third state C via a photo-induced, irreversible transformation, as shown in step 22. A uniform illumination at wavelength $\lambda_1$ converts the molecules 34 in state A back to state B. The molecule 36 in state C is unaffected, as shown in step 23.

The sample is then moved with respect to the 3-D node 38 at $\lambda_2$ to a different location and the three steps 21-23 are repeated as shown in steps 24-26, steps 27-29, and steps 30-32. By moving in all 3 dimensions, permanent patterns in state C can be formed as shown in FIG. 3. If the state C is preferentially soluble in a solvent over states A and B, then 3-D topological features can be realized.

This technique of using reversible and irreversible photo-induced transitions for nanopatterning is significant. The invention overcomes the far-field diffraction limit in optical patterning. Also, the invention does not require high-intensity ratios compared to absorbance modulation or high absolute intensities, since the saturation of the B→A transition is dependent on the deposited energy (intensity×time). So, even at low intensities, with sufficient exposure time, single-molecule resolution can be attained as long as the node is sufficiently dark. A large array of nodes, such as from standing waves (in 1-D) or from an array of dichromats or other optical elements (in 2-D), can enable this nanopatterning in a massively parallel fashion. Since a good quality node is only required at $\lambda_2$, whereas the other two wavelengths involve uniform illumination, the optical system should be relatively simple.

Figure 4:
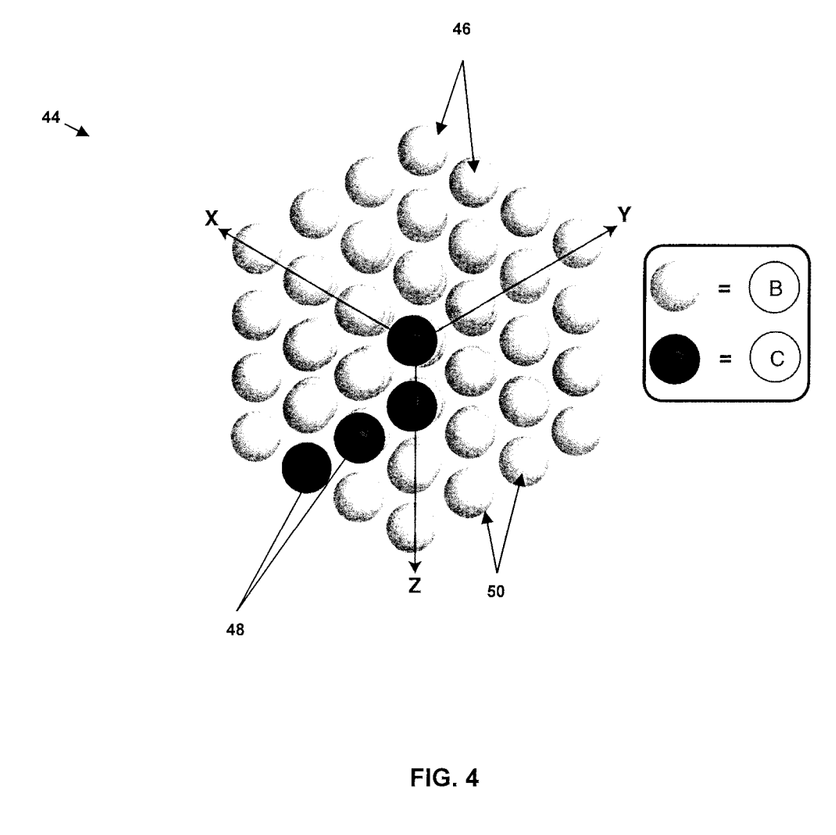
FIG. 4 is a schematic diagram illustrating the 3-D pattern shown in FIG. 3.

A rendering of the pattern in 3-D is shown in FIG. 4. The molecules 46 are assumed to form a square lattice 44 in the diagrams for simplicity. In general, the molecules will be randomly oriented and 3-D features might require more than one molecule for structural integrity. Nevertheless, the techniques described in this document are equally applicable irrespective of the actual distribution of the molecules in the layer, and 3-D spatial resolution approaching single-molecule dimensions should be feasible. The dark spheres 48 represent molecules in the permanent state C, while the white spheres 50 represent molecules in state B. State B can be changed to state A via exposure to light at $\lambda_1$, whereas state C cannot.

Figure 5:
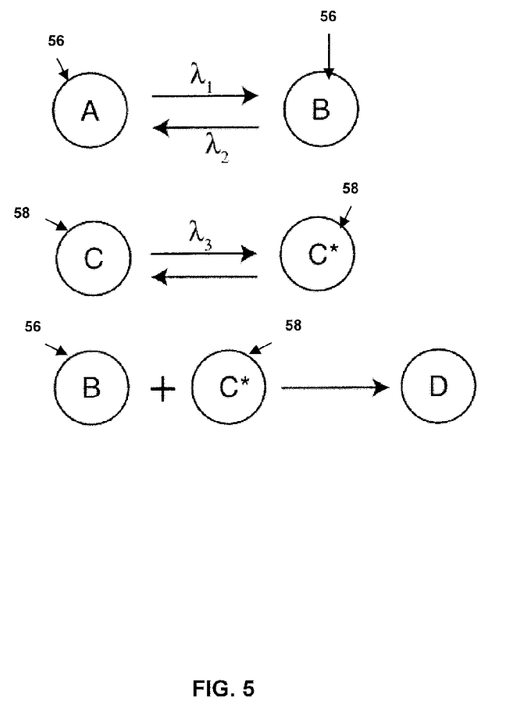
FIG. 5 is a schematic illustrating a scheme using a two-material mixture system.

An alternative approach is to use a two-material mixture system. As illustrated in FIG. 5, the material system includes two molecules 56, 58, initially in states A and C, respectively. When the first molecule 56 in state A is illuminated at wavelength $\lambda_1$, it becomes B. When state B is illuminated with $\lambda_2$, it becomes A. When the second molecule 58 in state C is illuminated with $\lambda_3$, it forms an excited state C*. Molecules 58 in state C* and those molecules 56 in state B react to form a product D. This reaction may be photocatalyzed, but not necessarily. This reaction is irreversible. If no molecules 56 in state B are present in the vicinity of C*, the molecules 58 in state C* relax back to the ground state C when the illumination at $\lambda_3$ is turned off. It is essential that sufficient molecules 58 of C are available to react with B. Otherwise, species starvation will limit the patterning process as will be evident later. It is also important to note that states B, C, C* and D have negligible absorption at $\lambda_1$, states A, C, C* and D have negligible absorption at $\lambda_2$, states A, B, C* and D have negligible absorption at $\lambda_3$.

Figure 6:
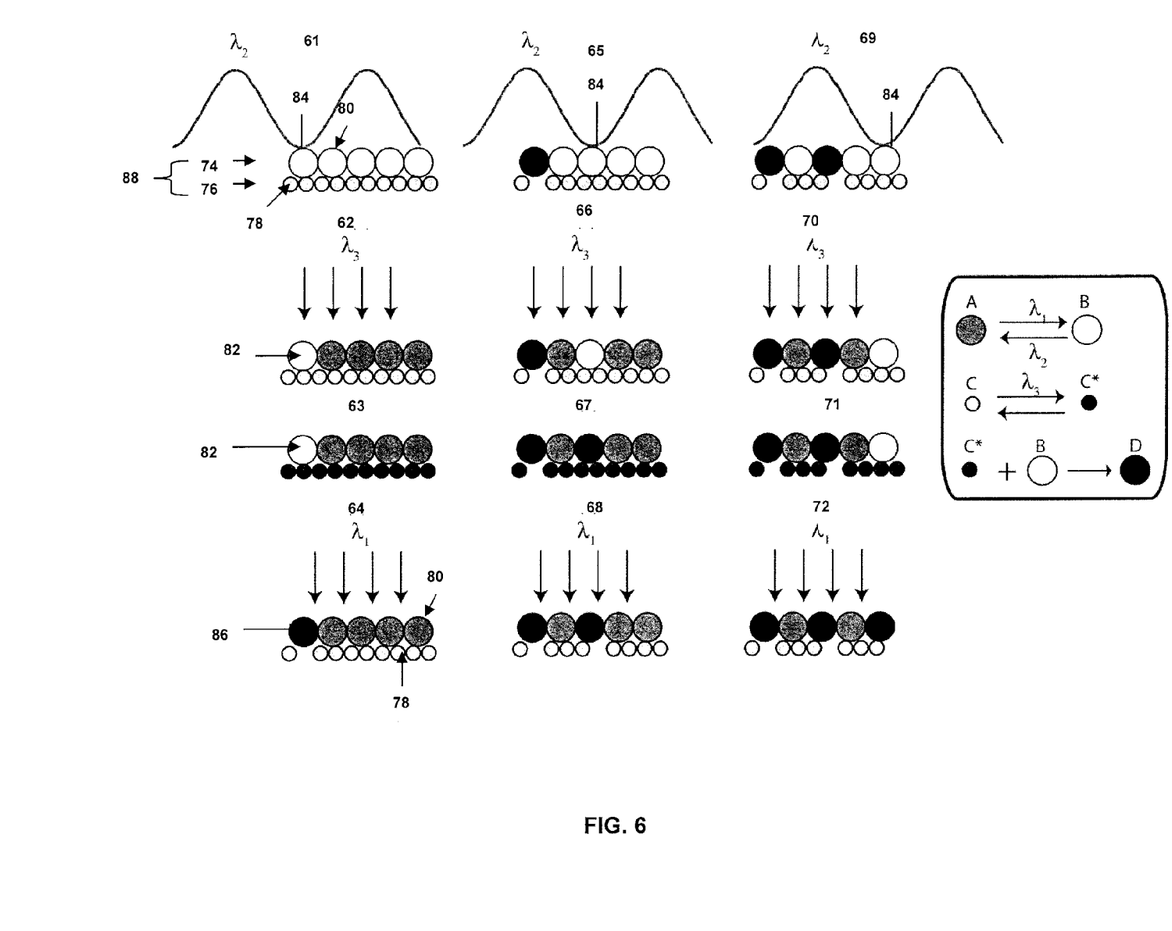
FIG. 6 is a schematic diagram illustrating the sequence of steps for 2-D patterning with single-molecule resolution using a two-material mixture system and three wavelengths.

This material system 88 having two layers 74, 76 can be used to perform 2-D patterning with single-molecule resolution as illustrated in FIG. 6. All molecules 78, 80 are assumed to be in state B or in ground state C. The two different molecules 78, 80 are represented by circles of different sizes. The sequence of steps is described herein. The material system 88 comprising a mixture of two molecules 78, 80 is illuminated by a node 84 at $\lambda_2$. After sufficient exposure time, all molecules 78, 80 in state B are converted to state A except at the node 84, where a single molecule 82 is left in state B. The layer is uniformly illuminated with $\lambda_3$. This excites all molecules in state C to C*, as shown in step 62. The molecules 78 in state C* react with molecules in state B in their vicinity, which is the single molecule 82 at the location where the node 84 was previously, to form a molecule 86 of product D, as shown in step 63. This reaction is irreversible. Unreacted molecules 78 in state C* relax to their ground state C. The material system 88 is illuminated by $\lambda_1$ and all molecules 78, 80 in state A convert back to state B, as shown in step 64.

These four steps 61-64 are repeated after moving the sample with respect to the node 84 by the requisite distance as shown in steps 65-68 and steps 69-72. By moving the node 84 in all 3 dimensions, 3-D patterns, again down to single-molecule resolution can be achieved. The sequence of steps is analogous to those illustrated in FIG. 3.

Any thermally-stable photochromic system (AIB) containing electroactive moieties will qualify for use in the system described herein. Specifically, the thermally stable photochromic system must display an increase in conjugation length upon illumination with $\lambda_1$ and, conversely, a decrease in conjugation length upon illumination with $\lambda_2$. In the specific case detailed in the above scheme, bithienylethene (BTB) serves as the photochromic system.

Component C must be a photoactivated reductant or oxidant so that a redox reaction does not occur between components A, B and C in the absence of a specific photon input. In the case detailed above, ruthenium tris(bipyridine) dichloride ($Ru(bpy)_3Cl_2$) serves as a photooxidant. A metal-to-ligand charge transfer (MLCT) transition in $Ru(bpy)_3Cl_2$ is selectively excited at 465 nm, thus creating both a ruthenium center that is a strong electron acceptor and a bipyridine radical anion that can act as an electron donor.

Due to the presence of bithiophene moieties in BTE (that are easily oxidized), the excited $Ru(bpy)_3Cl_2$ can act as a one-electron electron acceptor. However, in state A, the oxidation potential of the bithiophene arms is too high for electron transfer to occur. Upon transformation to state B, however, the oxidation potential of the photochrome is lowered by approximately 0.5 V and the electron transfer reaction from BTE (B) to Ru(bpy)$_3$Cl$_2$ is energetically favorable. The complex product (D) is preferentially dissolved in methanol after all the patterning is completed.

Additionally, we predict that BTE (B) will liberate two electrons sequentially to form the stable dication shown above. Thus, the stiochiometry of the redox reaction requires two ruthenium complexes per photochrome.

Figure 7:
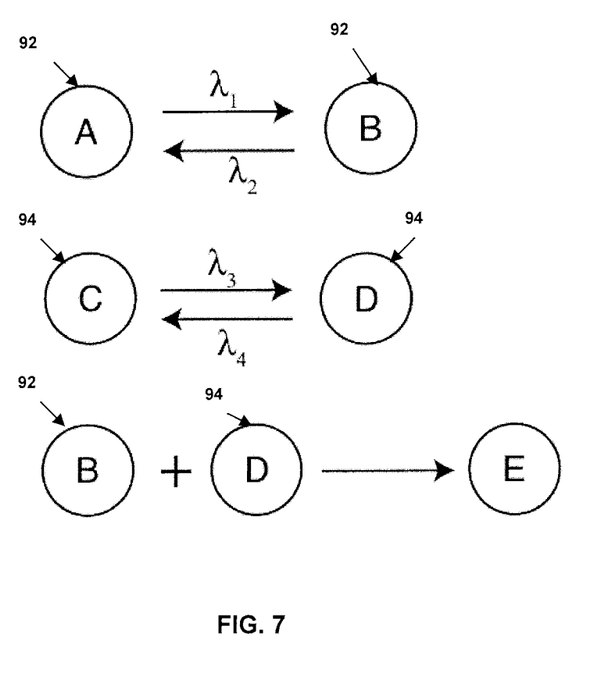
FIG. 7 is a schematic diagram illustrating an alternative set of transitions in a two-material system using four wavelengths.

A third alternative set of transitions is illustrated in FIG. 7. The system is a mixture of two different materials 92, 94. Each one undergoes reversible photo-initiated transitions as indicated. When molecules 92 in state A are illuminated by $\lambda_1$, they convert to state B; those in state B revert to state A upon illumination by $\lambda_2$. When molecules 94 in state C are illuminated by $\lambda_3$, they convert to state D; those in state D revert to state C upon illumination by $\lambda_4$. When molecules 92, 94 in states D and B are in close vicinity, they undergo an irreversible reaction to form a product E. This reaction may or may not be photoinitiated. It is important to note that states B, C, D and E have negligible absorption at $\lambda_1$; states A, C, D and E have negligible absorption at $\lambda_2$; states A, B, D and E have negligible absorption at $\lambda_3$; and states A, B, C, and E have negligible absorption at $\lambda_4$.

Figure 8:
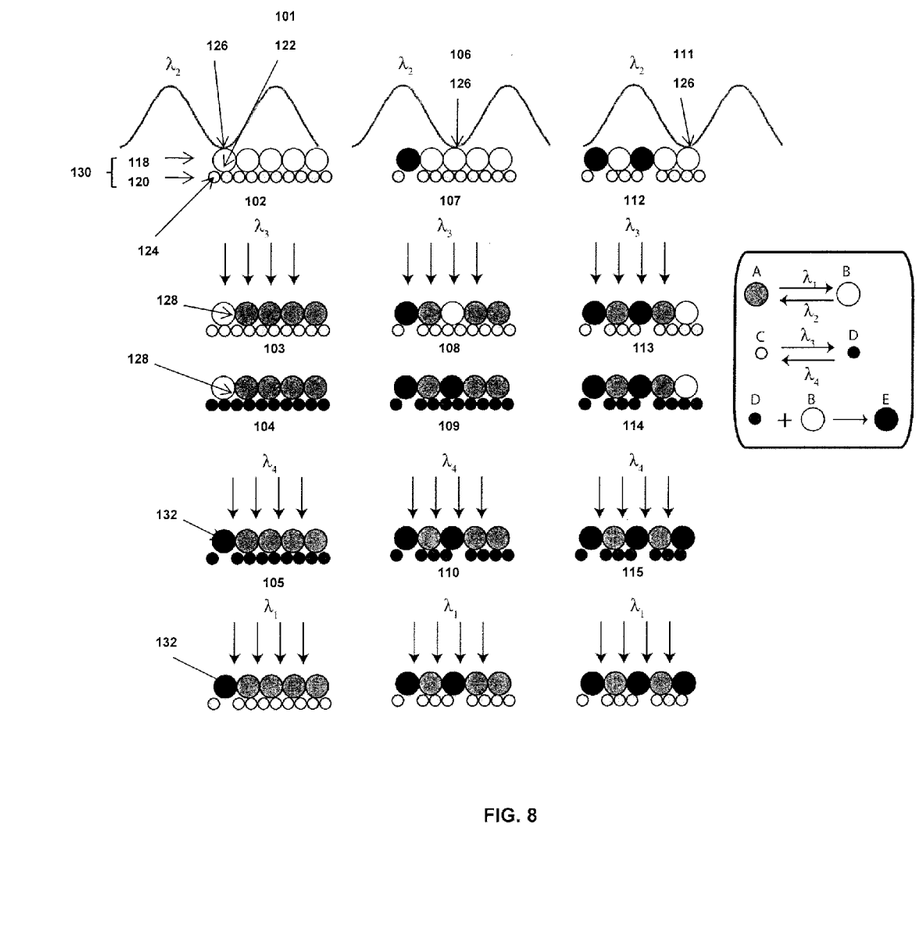
FIG. 8 is a schematic diagram illustrating 2-D nanopatterning using a 2-material system and 4 wavelengths.

The sequence of steps to use the above material system for 2-D nanopatterning is illustrated in FIG. 8. It is assumed that all molecules begin in either state B or state C. The sequence of steps is described herein. The material system 130 having layers 118 and 120 comprising a mixture of two molecules 122, 124 is illuminated by a node at $\lambda_2$. After sufficient exposure time, all molecules in state B are converted to state A except at the node 126, where a single molecule 128 is left in state B. The material system 130 is uniformly illuminated with $\lambda_3$. This converts all molecules in state C to state D. The molecules in state D react with molecules in state B in their vicinity, which is the single molecule 132 at the location where the node 126, was previously, to form a product E. This reaction is irreversible. The material system 130 is uniformly illuminated with $\lambda_4$. This converts all molecules in state D back to state C. The layer is uniformly illuminated with $\lambda_1$. This converts all molecules in state A back to state B. Steps 104 and 105 can be inter-changed.

The sample is moved relative to the node 126 as shown and the above five steps 101-105 are repeated as shown in steps 106-110 and steps 111-115. Patterns with single-molecule resolution are formed as indicated in FIG. 8. By moving the sample relative to the node 126 at $\lambda_2$ in 3 dimensions, this is readily extended to 3-D nanopatterning. The approach is analogous to that shown in FIG. 3.

Figure 9A:
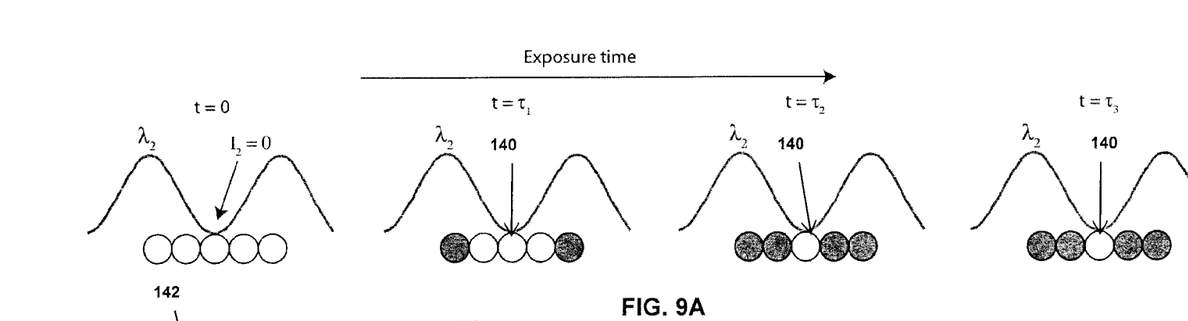
FIGS. 9A-9B are schematic diagrams illustrating the effect of a node with non-zero intensity.
Figure 9B:
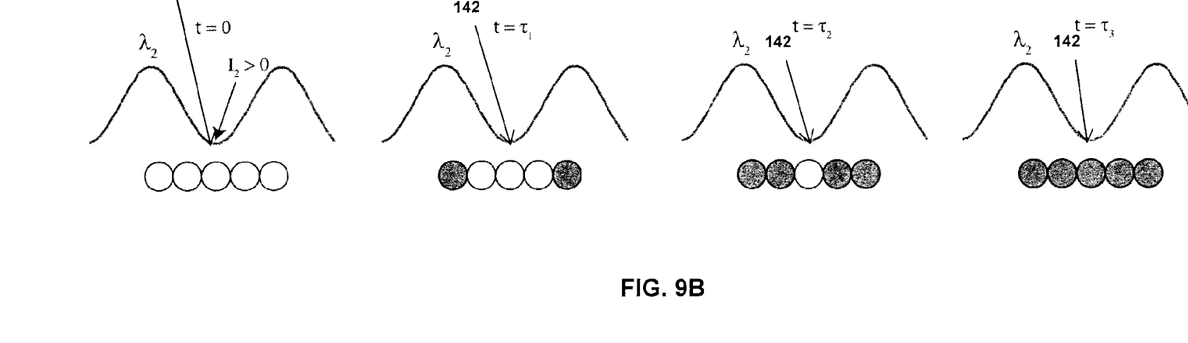

The node is critical to achieving single-molecule resolution. However, its quality is not as significant as one might expect. This is illustrated schematically in FIGS. 9A-9B. The photoinitiated reaction B→A is dependent on exposure dose (intensity×time). If the intensity in the node 140 is truly zero as shown in FIG. 9A, then a single molecule will remain in state B for all exposure times 0, $\tau_1$, $\tau_2$, $\tau_3$. In the example shown, as long as the exposure time is over $\tau_2$, there is only molecule left in state B. On the other hand, if the intensity in the node 142 is greater than zero as shown in FIG. 9B, then all molecules will convert to state A eventually. However, there is an interval of exposure times (which depends on the intensity in the node), where a single molecule remains in state B. In the example shown, as long as the exposure time is in between $\tau_2$ and $\tau_3$, a single molecule can remain in state B and single-molecule resolution is possible. From a practical standpoint, the actual exposure time can readily be obtained by a calibration step. This will depend on the actual intensity in the node, the slope of the intensity near the node and the desired spatial resolution (single molecule or larger).

Figure 10A:
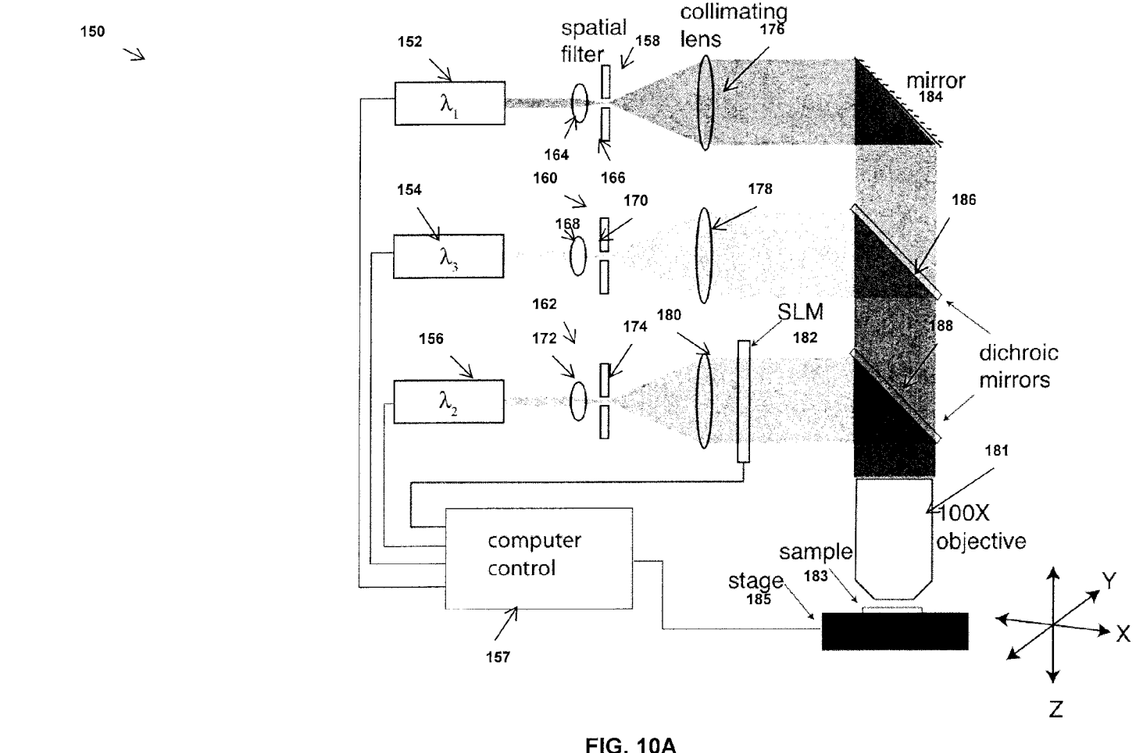
FIGS. 10A-10B are schematic diagrams illustrating the optical systems formed using the invention.
Figure 10B:
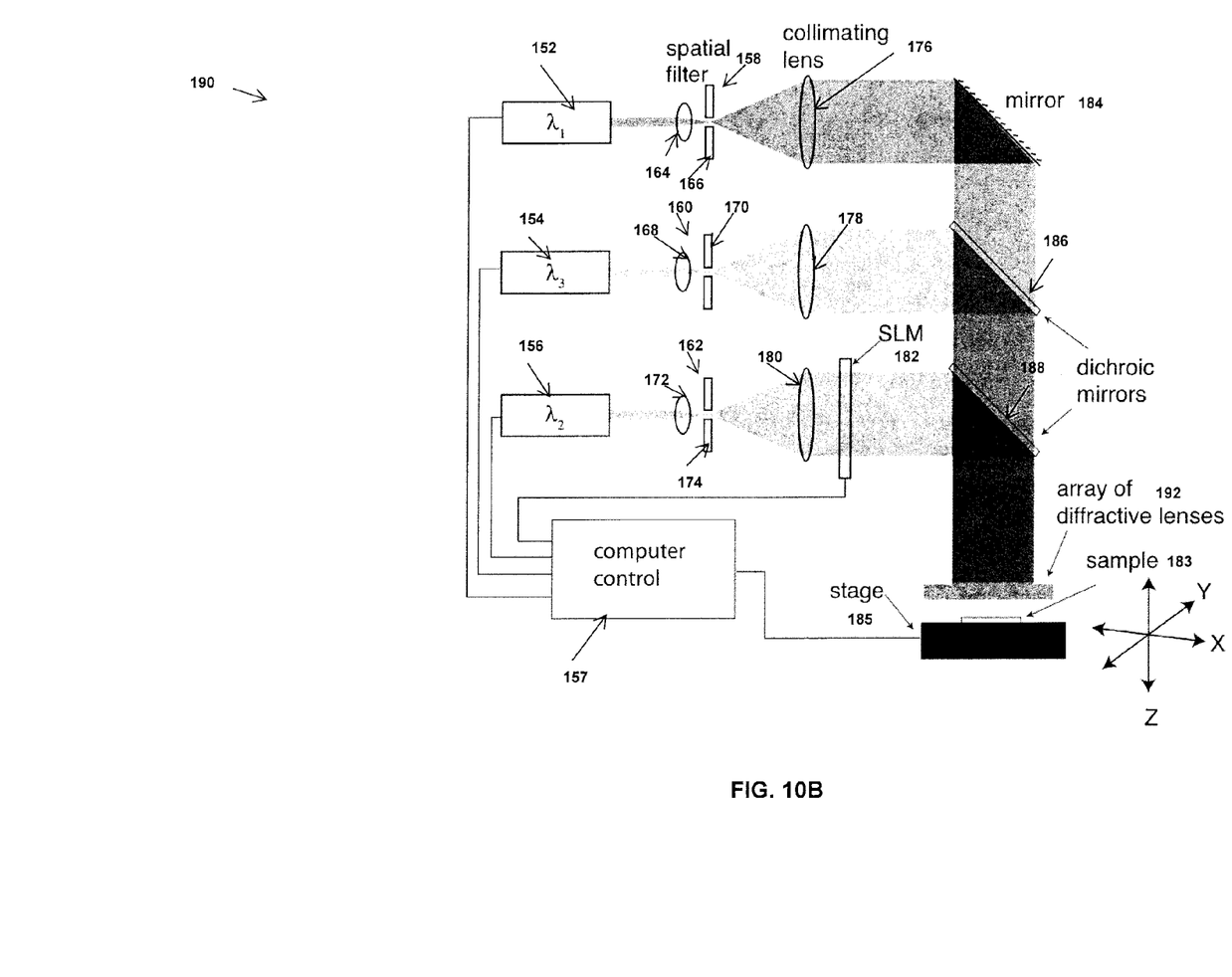

The invention allows for the implementation of optical systems to demonstrate 3-D nanopatterning. Two optical systems 150, 190 are illustrated in FIGS. 10A-10B. The configuration in FIG. 10A uses a microscope objective 181 to focus the beams, whereas the one in FIG. 10B uses an array of diffractive lenses 192 to generate an array of optical nodes at $\lambda_2$ co-incident with an array of bright spots at $\lambda_1$ and at $\lambda_3$. Such diffractive lenses 192 can be similar to the so-called trichromats. The optical systems include light sources producing light having wavelengths of $\lambda_1$, $\lambda_2$, and $\lambda_3$ respectively. The light produced by the light sources 152, 154, 156 pass thru spatial filters 158, 160, 162. Each of the spatial filters 158, 160, 162 includes a lens structure 164, 168, 172 and grating element 166, 170, 174 that permits light to pass. The outputs of the spatial filters 158, 160, 162 are sent to collimating lenses 176, 178, 180 for focusing. The collimating lens 176 sends focused light to a mirror structure 184 and the collimating lens 178 sends focused light to dichroic mirror structure 186. Also, the collimating lens 180 sends its focused light to a spatial light modulator (SLM) 182 which is then outputted to a dichroic mirror structure 188. The dichroic mirror 186 receives reflective light from the mirror structure 184 and the dichroic mirror structure 188 receives reflected light from the dichroic mirror structure 186. In FIG. 10A, the microscope objective 181 collects the reflected light from the dichroic mirror structure 188 to produce a focused beam to be applied to a sample 183 while in FIG. 10B an array of diffractive lenses 192 collects the reflected light from the dichroic mirror 188 and produces a focused beam to be applied on the sample 183. The sample 183 is positioned on a stage 185 that is controlled by computer control module 157. The computer control module 157 controls the position of the stage 185 when a focused beam is applied to the sample 183.

The computer control module 157 also controls the light sources 152, 154, 156 and SLM 182. This allows for control when each of the light sources 152, 154, 156 is active for exposure.

Figure 11:
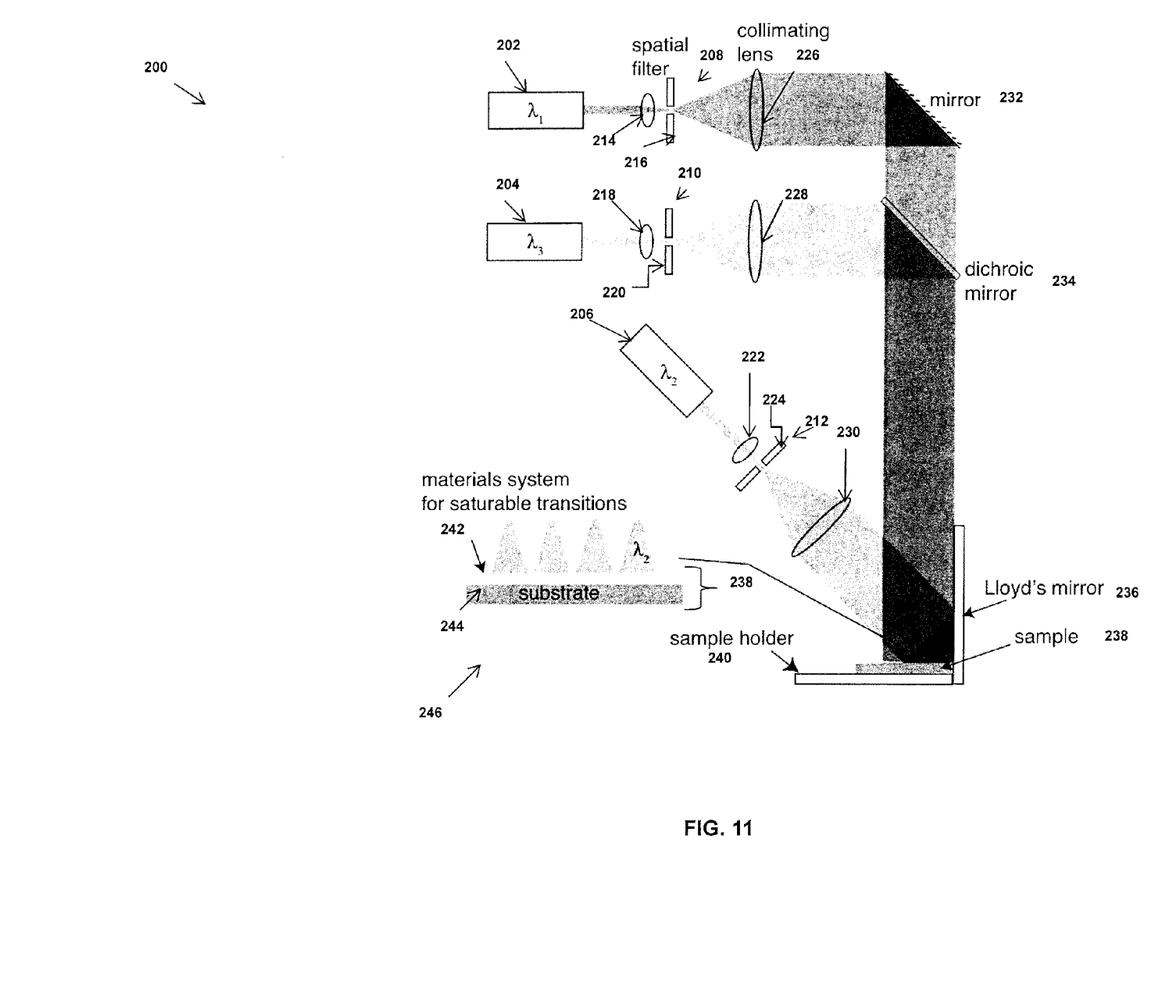
FIG. 11 is a schematic diagram illustrating Lloyd's mirror interference-lithography system formed in accordance with the invention.

FIG. 11 shows a Lloyd's mirror-interference-lithography system 200 that can incorporate sources at $\lambda_1$ and $\lambda_2$. The optical system includes include light sources 202, 204, and 206 producing light having wavelengths of $\lambda_1$, $\lambda_2$, and $\lambda_3$ respectively. The light produced by the light sources 202, 204, 206 pass thru spatial filters 208, 210, 212. Each of the spatial filters 208, 210, 212 includes a lens structure 214, 218, 222 and grating element 216, 220, 224 that permits light to pass. The outputs of the spatial filters 208, 210, 212 are sent to collimating lenses 226, 228, 230 for focusing. The collimating lens 226 sends focused light to a mirror structure 232 and the collimating lens 228 send focused light to a dichroic mirror structure 234. Also, the collimating lens 230 sends its focused light to a Lloyd's mirror structure 236 which produces a standing wave at $\lambda_2$ on the sample surface 238 as shown in the inset 246. Note the sample 238 include a material layer 242 and a substrate 244. The sample 238 is positioned on a sample holder 240. The light sources 202, 204, 206 are placed so as to uniformly expose the sample 238, when required. The optical system 200 can be used to characterize the different materials. This system can also be used to demonstrate nanopatterning in 1-D using the current invention.

Also, the optical system 200 can be augmented with fringe locking and fringe shifting capabilities to perform multiple exposures. If the standing wave at $\lambda_2$ can be moved with nanometer precision relative to its previous position, it is possible to pattern lines spaced with varying nanometric distances within the 1-D period of the standing wave. Furthermore, simply varying the exposure times of $\lambda_2$ can vary the linewidths. Limited 2-D patterning can be achieved by rotating the sample with respect to the axis of the Lloyd's mirror 236. This would enable patterning of complex geometries in 2-D at the macro-molecular resolution with periodic boundary conditions over large areas in an inexpensive and quick fashion. Applications of this technology include 2-D and 3-D (via layer-by-layer approach) metamaterials, photonic crystals, scaffolds for tissue engineering, or the like.

Although the present invention has been shown and described with respect to several preferred embodiments thereof, various changes, omissions and additions to the form and detail thereof, may be made therein, without departing from the spirit and scope of the invention.

What is claimed is:

1. An optical structure comprising:
    one or more material layers having spectrally selective reversible and irreversible transitions at a plurality of wavelengths including uniform illumination by saturating one of the spectrally selective reversible transitions with an optical node in selectively retaining a single molecule, with sufficient exposure time, from a layer of photosensitive molecules in a configuration and exposing the single molecule to its spectrally irreversible transitions to form a pattern, said photosensitive molecules display an increase in conjugation length upon illumination with a first wavelength and a decrease in conjugation length upon illumination with a second wavelength, said optical node being positioned at a location of desired exposure, said pattern comprises a three dimensional nanopattern, wherein said exposure time depends on actual intensity in said node, slope of said intensity of said node, and desired spatial resolution.

2. The optical material system of claim 1, wherein said one or more material systems comprises one material layer.

3. The optical material system of claim 2, wherein said spectrally selective reversible transition comprises a single reversible transition and single irreversible transition.

4. The optical material system of claim 1, wherein said one or more material systems comprises three material layers.

5. The optical material system of claim 4, wherein said spectrally selective reversible transition comprises a two reversible transitions and a single irreversible transition.

6. The optical material system of claim 1, wherein said pattern comprises a two dimensional nanopattern.

7. An optical system for nanopatterning comprising:
    a plurality of light sources for providing spectral energy having a plurality of different wavelengths;
    an optical structure comprising one or more material layers having spectrally selective reversible and irreversible transitions associated with said different wavelengths including uniform illumination, said light sources for providing spectral energy saturates one of the spectrally selective reversible transitions with an optical node in selectively retaining a single molecule, with sufficient exposure time and as long as said node is sufficiently dark, from a layer of photosensitive molecules in a configuration and exposing the single molecule to its spectrally irreversible transitions to form a pattern, said photosensitive molecules display an increase in conjugation length upon illumination with a first wavelength and a decrease in conjugation length upon illumination with a second wavelength, said optical node being positioned at a location of desired exposure, said pattern comprises a three dimensional nanopattern, wherein said exposure time depends on actual intensity in said node, slope of said intensity of said node, and desired spatial resolution.

8. The optical system of claim 7, wherein said one or more material systems comprises one material layer.

9. The optical system of claim 8, wherein said spectrally selective reversible transition comprises a single reversible transition and single irreversible transition.

10. The optical system of claim 7, wherein said one or more material systems comprises three material layers.

11. The optical system of claim 10, wherein said spectrally selective reversible transition comprises a two reversible transitions and a single irreversible transition.

12. The optical system of claim 7, wherein said pattern comprises a two dimensional nanopattern.

* * * * *